United States Patent [19]
Rollwitz

[11] 3,764,892
[45] Oct. 9, 1973

[54] SPECTROSCOPIC APPARATUS

[76] Inventor: William L. Rollwitz, c/o Southwest Research Institute, P.O. Box 2296, San Antonio, Tex. 78206

[22] Filed: Jan. 4, 1971

[21] Appl. No.: 103,841

Related U.S. Application Data

[63] Continuation of Ser. No. 777,655, Nov. 21, 1968, abandoned.

[52] U.S. Cl.................. 324/0.5 R, 307/306, 330/35
[51] Int. Cl. ............................................. G01n 27/78
[58] Field of Search ...................... 324/0.5 R, 0.5 A, 324/0.5 AH; 330/35; 331/3, 94; 307/306

[56] References Cited
UNITED STATES PATENTS

| | | | |
|---|---|---|---|
| 3,195,061 | 7/1965 | Jeffries................................. | 331/94 |
| 3,454,875 | 7/1969 | Bol....................................... | 325/0.5 |
| 3,419,794 | 12/1968 | Weaver................................. | 325/0.5 |

OTHER PUBLICATIONS

F. E. Kingston and K. Lee, Field Effect Transistor At 4.2°K, Rev. of Sci. Instr. 39(4), April, 1968, pp. 599–601.

Primary Examiner—Michael J. Lynch
Attorney—Donald Gunn

[57] ABSTRACT

A magnetic resonance spectroanalysis device is disclosed. A sample having an isotope of interest is passed through a coil. The sample is subjected to nuclear magnetic resonance, electron magnetic resonance, or nuclear quadrapole resonance. The sample forms signals interacting with a radiofrequency tank circuit including a coil made of superconducting materials and operated below the critical temperature. Signals indicative of the sample are proportional to the Q of the coil which is increased from perhaps $10^2$ to about $10^7$ or $10^8$.

8 Claims, 10 Drawing Figures

William L. Rollwitz
INVENTOR.

BY Donald Gunn
ATTORNEY

William L. Rollwitz
INVENTOR.

BY Donald Gunn

ATTORNEY

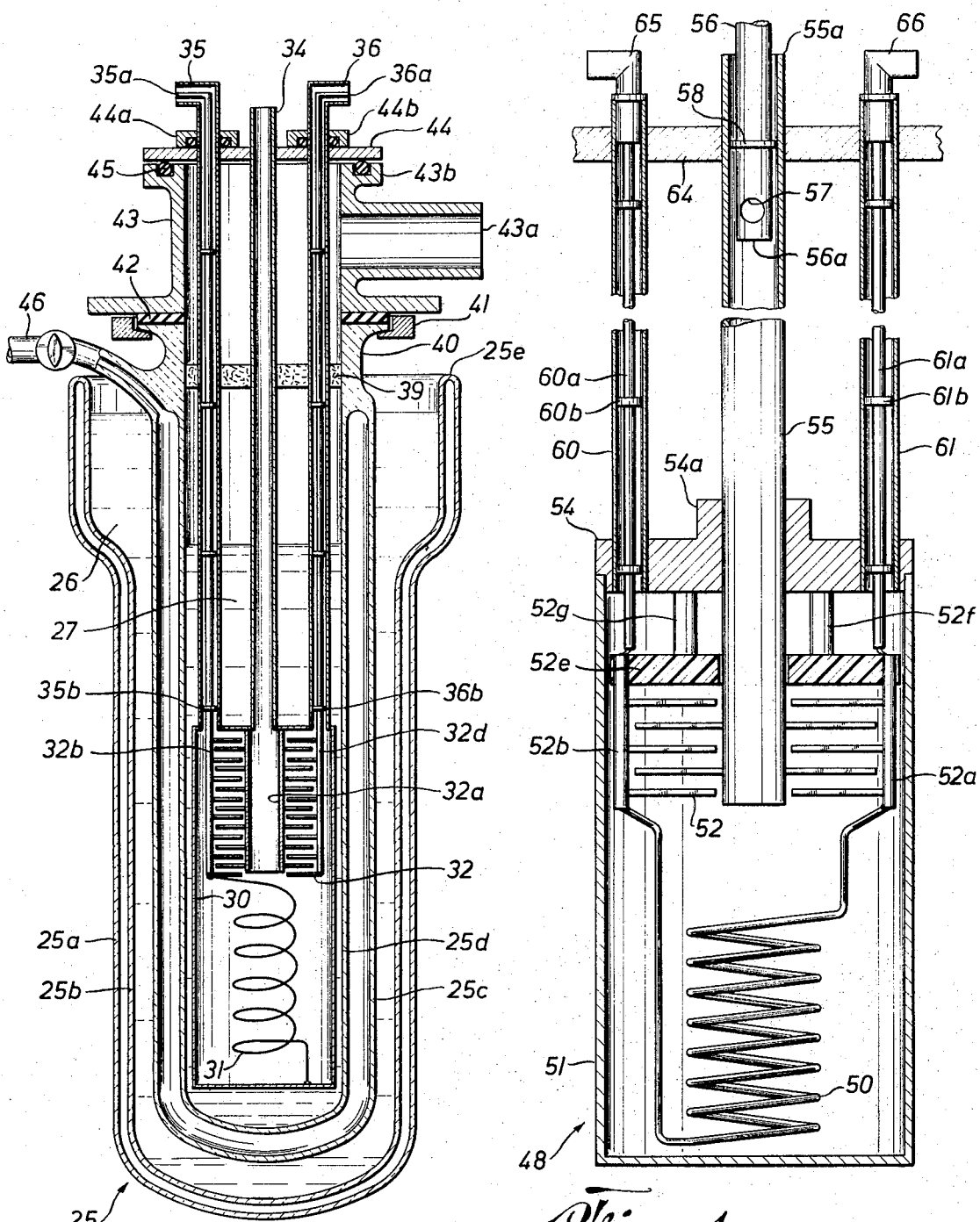

William L. Rollwitz
INVENTOR.

BY Donald Gunn
ATTORNEY

William L. Rollwitz
INVENTOR.

BY Donald Gunn
ATTORNEY

SPECTROSCOPIC APPARATUS

RELATED APPLICATIONS

The present application is a continuation of application Ser. No. 777,655, filed Nov. 21, 1968, now abandoned.

SUMMARY OF PROBLEM AND SOLUTION

Spectroscopic analysis is exceedingly important in chemical and medical fields of endeavor. Many onstream processes require continued monitoring which is often critical to controlling the real time correction to maintain production of a desired quality and quantity. In the medical area, spectroscopic analysis is likewise useful in clinical environments, during emergency procedures, and routine or complicated operations. In all uses of spectroanalysis, it will be appreciated that real time identification of various elemental and compound constituents and their relative percentages have substantial use.

Especially in medical applications, nondestructive testing of samples is exceedingly beneficial. For instance, nondestructive testing of certain organs and bones is an absolute requirement.

Devices currently available furnish the needed information in most cases. However, several infirmities exist in the currently available apparatus. In many cases, sample withdrawal and return to the onstream process is difficult if not impossible. In many uses, nondestructive testing is absolutely required. In other cases, the speed of analysis of current equipment is unacceptable. In other uses, the equipment currently available is limited to analysis of a single ingredient and is unable to provide full spectrum analysis. With these and other limitations in view, the device of the present invention is summarized as providing spectroscopic analysis in cooperation with magnetic resonance apparatus wherein a sample is placed in an appropriate magnetic field wherein a voltage is induced in appropriate detection means indicating resonance in accordance with the teachings of the present invention. More particularly, the device of the present invention incorporates superconducting detection means of a high Q factor whereby the output of the detection means is substantially increased and sensitivity of the apparatus is extended to most chemically significant elements. Further, the device is summarized as apparatus responsive to a number of isotopes (of most elements) that suitable information concerning the compounds of the sample is likewise derived and including elemental binding information to further define the sample.

One object of the present invention is to provide new and improved spectroscopic apparatus yielding real time analysis of a great number of chemical elements found in a sample.

Another object of the present invention is to provide a new and improved spectroscopic apparatus which performs elemental analysis nondestructively, and which is even capable of inter vivos measurements.

Yet another object of the present invention is to provide spectroscopic apparatus making multiple elemental determinations from only one sample without destruction of the sample.

An important object of the present invention is to provide new and improved spectroscopic apparatus for continuous monitoring onstream processes.

Another important object of the present improved invention is to provide a measure of the concentrations of elements themselves and additional information concerning the chemical binding acting on the various elements.

A related object of the present invention is to provide new and improved spectroscopic analysis apparatus providing elemental concentrations in just a few seconds as opposed to minutes or hours required for current analytical apparatus.

A further object of the present invention is to provide new and improved analytical apparatus bringing out signals for appropriate indicating means at a suitable signal level.

Other objects and advantages of the present invention will become more readily apparent from a consideration of the included specification and drawings, wherein:

FIG. 3 shows a further alternative embodiment to the present invention;

FIG. 4 is an enlarged sectional view of detection means adapted to be inserted into the structure of FIG. 3;

Figure 8:
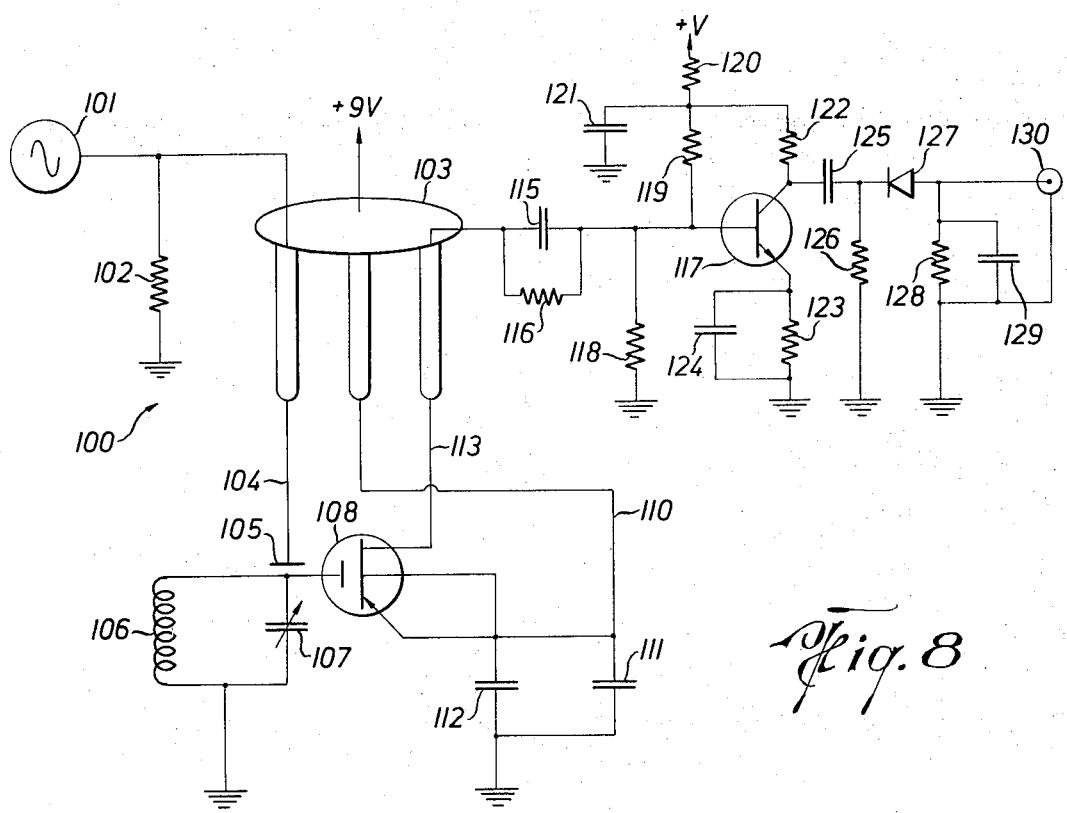
Figure 9:
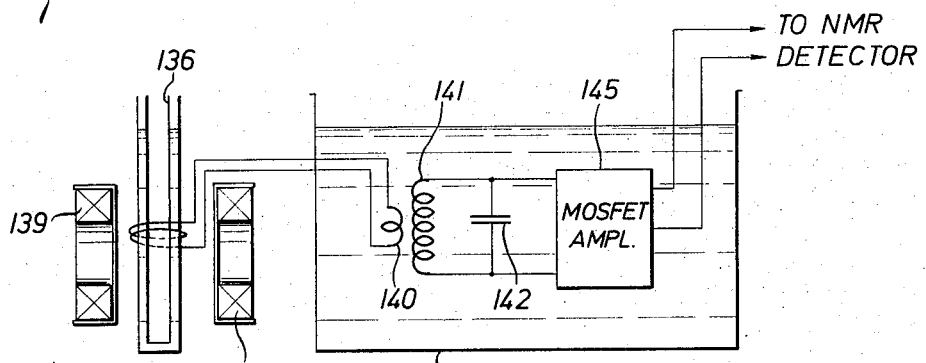
Figure 10:
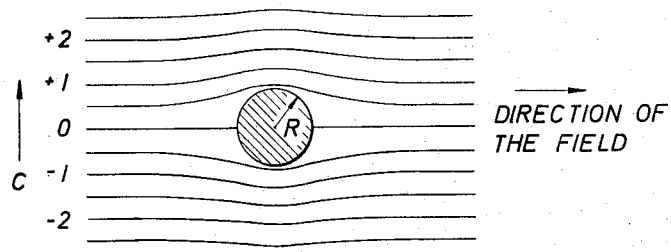

FIG. 8 further illustrates an alternative embodiment of signal amplifying means for use with the present invention;

FIG. 9 shows the arrangement of the amplifying circuitry communicated with the detecting means during installation; and, FIG. 10 is a cross section of a wire showing the Meissner effect.

Before considering the detector apparatus of the present invention, a general description of magnetic resonance techniques is considered helpful. Briefly, nuclear and electron particles of molecules have an almost immeasurable magnetic moment which, when located in a magnetic field, has certain finite or discrete energy states. The sample undergoing magnetic resonance analysis is placed within the field of a magnet having a field strength of perhaps a few to thousands of gauss with the field intensity oscillated about a fixed level in conveniently small variations as a function of time. An oscillator communicating with a tuned circuit serving as detection means is placed in near proximity to the sample. The resonant frequency associated with the electrons or nuclei of the selected atoms is perceived by a drop in voltage of the tuned circuit coupling the oscillator to the sample and which also cooperates as detection means as will be discussed in greater detail hereinafter. The variations in energy required to sustain terminal voltage during a sweep of frequencies surrounding the resonant frequency is an indication of resonance and, upon knowing the resonant frequency, the element is then identified gualitatively and quantitatively.

Figure 1:
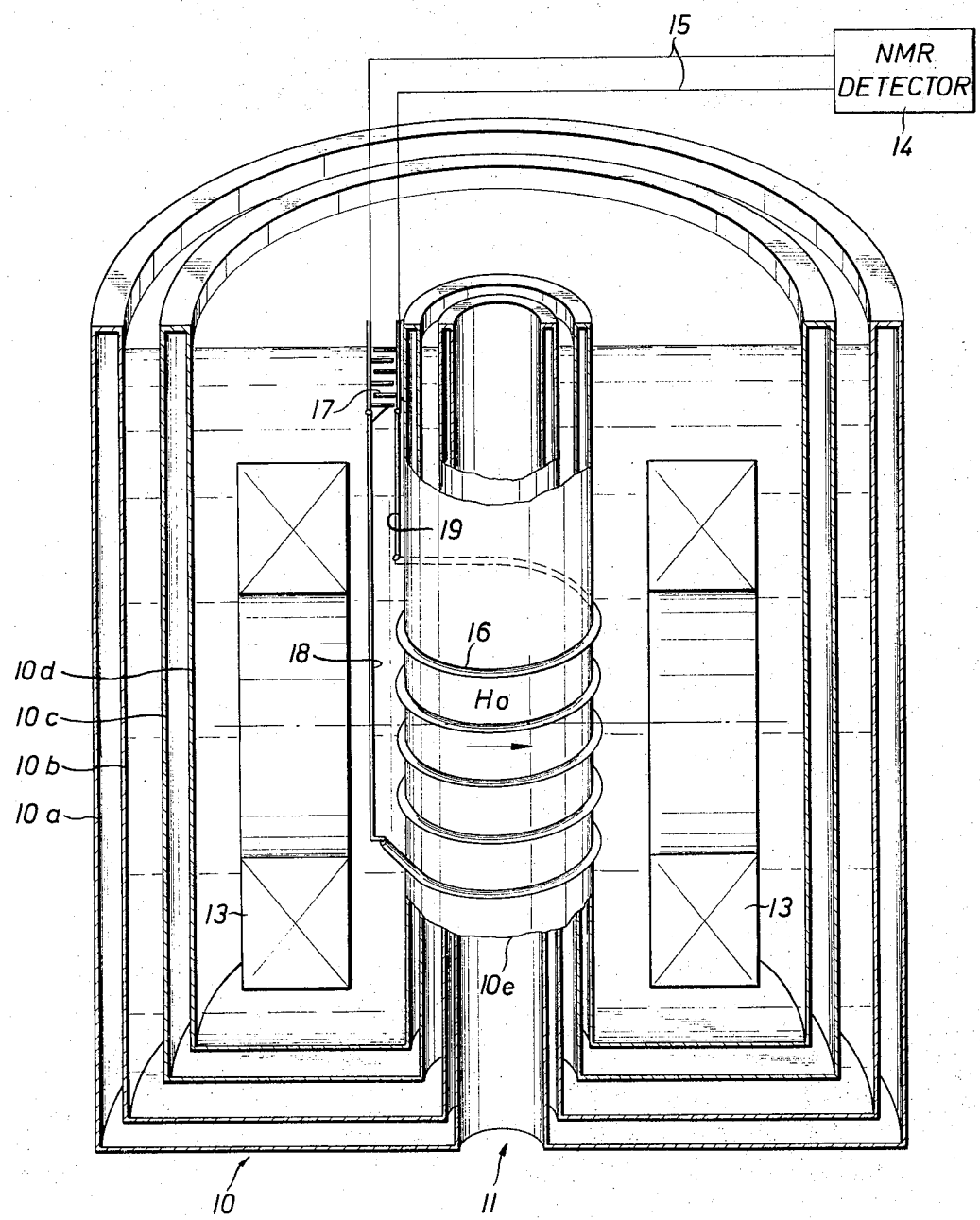
FIG. 1 is a sectional view of the detection apparatus of the present invention.

With the short foregoing summary of magnetic resonance analysis in view, attention is first directed to FIG. 1 of the drawings for a description of apparatus cooperative with a large magnet impressing a field on the sample and apparatus as will be noted. More will be discussed concerning the nuclear magnetic resonance detector and the detection means of the present invention hereinafter.

In FIG. 1, the sectional view of a double reentrant Dewar container indicated by the numeral 10 is shown. The double re-entrant Dewar container 10 is comprised of a plurality of concentric walls indicated by the numerals 10a, 10b, 10c and 10 d. The multiple walls enable superconducting temperatures for the present apparatus as will be described. More particularly, the container 10 is preferably a cylindrical structure with a central ambient temperature passage 11. The view of FIG. 1 omits a covering or insulated covering member across the top portions of the container 10 for the sake of clarity, and it should be further noted that the various wall portions 10c and 10d are shown unsupported with respect to one another; in practice, the upper end of the container is closed and the walls are supported in spaced relationship to one another.

Directing attention to the outer and lower portions of the container 10, a vacuum chamber is formed between the walls 10a and 10b. This is evacuated and serves as a thermal barrier between the higher room temperature and liquid nitrogen between the walls 10b and 10c. The boiling point of liquid nitrogen is about 77°K as compared to the room temperature of about 300°K. Placing reflective material on the opposite faces of the walls 10a and 10b and evacuating the space to about $10^{-7}$ torr minimizes heat transfer from the liquid nitrogen and limits the tendency of the liquid nitrogen to boil off.

Referring further to FIG. 1, the space between the walls 10c and 10d is preferably evacuated and silver coated in the same manner as the walls 10a and 10b. As a matter of convenience, the vacuum in the space is preferably given by the same measure as that stated above. Then, internally of the wall 10d, an appropriately insulated receptacle for receiving liquid helium at about 4.2°K is formed.

One function of the apparatus shown in FIG. 1 is the provision of an ambient or room temperature sample well 11 through the container 10. To provide such apparatus, the container 10 is likewise protected by several walls defining insulated barriers adjacent the passage 11. For consistent identification, the reference numerals assigned to the outer walls of the container will likewise be used for the walls surrounding the ambient well 11, it being noted that the wall 10a is the outer surface of the container 10 and also forms the bottom portion of the container. The wall 10a is the exposed wall in the passage 11. The wall 10b is concentric with the wall 10a about the passage 11, and the opposing faces are preferably silvered and vacuum conditions are obtained about $10^{-7}$ torr. Additionally, the wall 10c is concentric about the passage 11 and the space between the walls 10b and 10c is adapted to receive liquid nitrogen in communication with that in the outer wall of the container 10. Since only one liquid nitrogen bath is provided, it will be appreciated and understood that the liquid helium within the container 10 is received in an all encompassing low temperature bath to aid and enhance operation of the present invention without excessive heat losses.

The walls 10c and 10d likewise surround concentrically the passage 11 and further extend the evacuated thermal barrier between the walls 10c and 10d. Internally of the wall 10d, the liquid helium is maintained at the low temperature of approximately 4°K.

From the foregoing, it will be appreciated that a hollow, cylindrically shaped volume filled with liquid helium is appropriately insulated to receive the detection apparatus. The insulating barriers located outwardly of the liquid helium bath include a vacuum barrier which is surrounded by a liquid nitrogen bath at perhaps 70°–77°K, which is then insulated from room atmosphere by an appropriate vacuum chamber between the walls 10a and 10b. The structure enables the superconducting techniques taught by the present invention wherein a spectroscopic analysis is obtained as will be described.

For use with nuclear magnetic resonance techniques, a magnet of appropriate choice and selection is positioned internally or externally of the container 10. While the external magnet is omitted from the view of FIG. 1, those skilled in the art will appreciate and understand formation of a magnetic field through the apparatus and acting on the sample yet to be described for chemical apparatus.

The numeral 13 in FIG. 1 indicates a superconducting Helmholtz Coil Pair placed within the liquid helium bath. The superconducting Helmholtz Coil Pair 13 is adapted to be used to form a magnetic field, perpendicular to the axis of sample well 11, acting on the sample undergoing investigation within the sample well 11. In some installations, it may be desirable to omit the superconducting Helmholtz Coil Pair 13 within the liquid helium bath and to use a conventional external magnet with pole pieces positioned at opposite sides of the containr 10. The inclusion of the Helmholtz Coil Pair in FIG. 1 indicates one suitable location for the source of magnetic field acting upon the sample undergoing spectroscopic investigation. With any magnet, for the direction of the axis of the radiofrequency coil 16 shown in FIG. 1, the magnetic field must be perpendicular to the radiofrequency field of the coil 16, in order for magnetic resonance absorption to take place.

The numeral 10e in FIG. 1 indicates that portion of the container wall which is exposed to the helium bath and is therefore at the lowest possible temperature and which is concentrically about the ambient temperature passage 11. The detection means of the present invention is preferably placed about the wall portion 10e as will be noted.

A suitable nuclear magnetic resonance detector means 14 is communicated by appropriate wiring 15 to a tuned resonant circuit comprising a coil 16 and capacitor 17. Two basic types of magnetic resonance detector were used. The first, oommonly known as the Rollins type (Rep. Prog. Phys., Vol. 12, p. 22, 1949), was used when a separate oscillator was fed into the resonant circuit through a small, loosely coupled coil as in FIG. 6 or through a small capacitor as in FIG. 7. The second, commonly known as the Robinson Circuit (J. Sci. Instr., Vol. 36, p. 481, 1959) uses regenerative feedback. Examples of feedback circuits are stated hereinafter in discussing the various illustrated circuits. Two or three self excited oscillator type detector circuits will be noted. Such circuits are sometimes termed a "marginal oscillator" by those skilled in the art, a term derived from the fact that the oscillations are easily influenced by signals coupled into the oscillator circuit. The coil 16 is wound concentrically about the wall 10e and is carried at a central point along the passage 11 so that the sample undergoing investigation is placed within the coil 16. The connections of the coil 16 and the capacitor 17 form a parallel resonant circuit. The capacitor 17 is shown as comprising a number of tunable plates positioned adjacent fixed plates. This provides a tunable device which therefore adjusts the resonant frequency of the tank circuit as one means of changing the sensitivity of the present apparatus when testing for resonant frequencies over a wide spectrum. Referring to details of construction, the coil 16 is preferably wound tightly about the wall 10e, and, if needed, is secured in position by appropriate standoffs secured to the wall 10e. A pair of feedthroughs 18 and 19 connected to the ends of the coil 16 communicate with the capacitor 17. Further, the capacitor 17 is communicated by appropriate terminals to suitable feedthroughs from the container 10 communicated with the wiring 15 extending to the detector means 14.

The detector means 14 incorporates a tunable oscillator communicating with the tank circuit in the container 10. In addition, means are incorporated for indicating frequencies at which resonance occurs. Moreover, signal amplitude measuring means are incorporated to indicate the quantity or proportion of the element discovered in the sample undergoing investigation.

Considering operation of the structure shown in FIG. 1, it should first be noted that the details of the magnetic resonance detector means 14 will be presently omitted from discussion. Preferably, superconducting materials are included in the construction of the capacitor 17 and the coil 16. For instance, the coil may be formed of niobium wire while the capacitor is a conventional butterfly or parallel plate capacitor having an appropriate coating thereon. A relatively thin coating of superconducting material, such as lead or lead-tin solders placed on copper or brass substrates is satisfactory. An even better coating is obtained by electroplating lead in a fluoborate bath using electrode depositation. Concerning operation of the superconducting means, appropriate superconducting temperatures are provided in the helium bath which alter operation of the coil 16 and the capacitor 17 comprising the resonant detection circuit means responding to the sample.

Referring further to operation of the superconducting detection means shown in FIG. 1, the quality factor or the Q of the circuitry has been measured easily in excess of one hundred thousand. Measurements up to and in excess of 10 million have likewise been made with various modifications of the circuitry shown in FIG. 1. Of significance, these measurements compare with Q factors of perhaps 50 – 250 in current magnetic resonance spectroanalysis and this substantial improvement in the Q factor improves the sensitivity of the magnetic resonance apparatus.

Of further interest in FIG. 1 is the fact that the passage 11 is adapted to receive the sample with a minimum of problems, and with optimum convenience. For instance, the passage 11 is adapted to receive a tube or the like through which, for example, the blood of a patient undergoing extensive or complicated surgery is passed for analysis by the present apparatus. This provides a technique of monitoring certain elemental constituents in the blood of the patient. By way of further example, onstream analysis of a chemical process is likewise available through the use of a tube or other conduit placed in the passage 11. Significantly, the testing is nondestructive; further, the analysis is obtained in real time to the convenience of the operator or user of the present apparatus.

A very useful feature of the improved spectroscopic apparatus is the ease in which data is obtained from inter vivos measurements. Thusly, the bone structure of a patient may be investigated by merely placing the patient's finger in the passage 11. While the foregoing factors are noted in use of the improved spectroscopic apparatus, additional benefits and features will be cited hereinafter.

Figure 2:
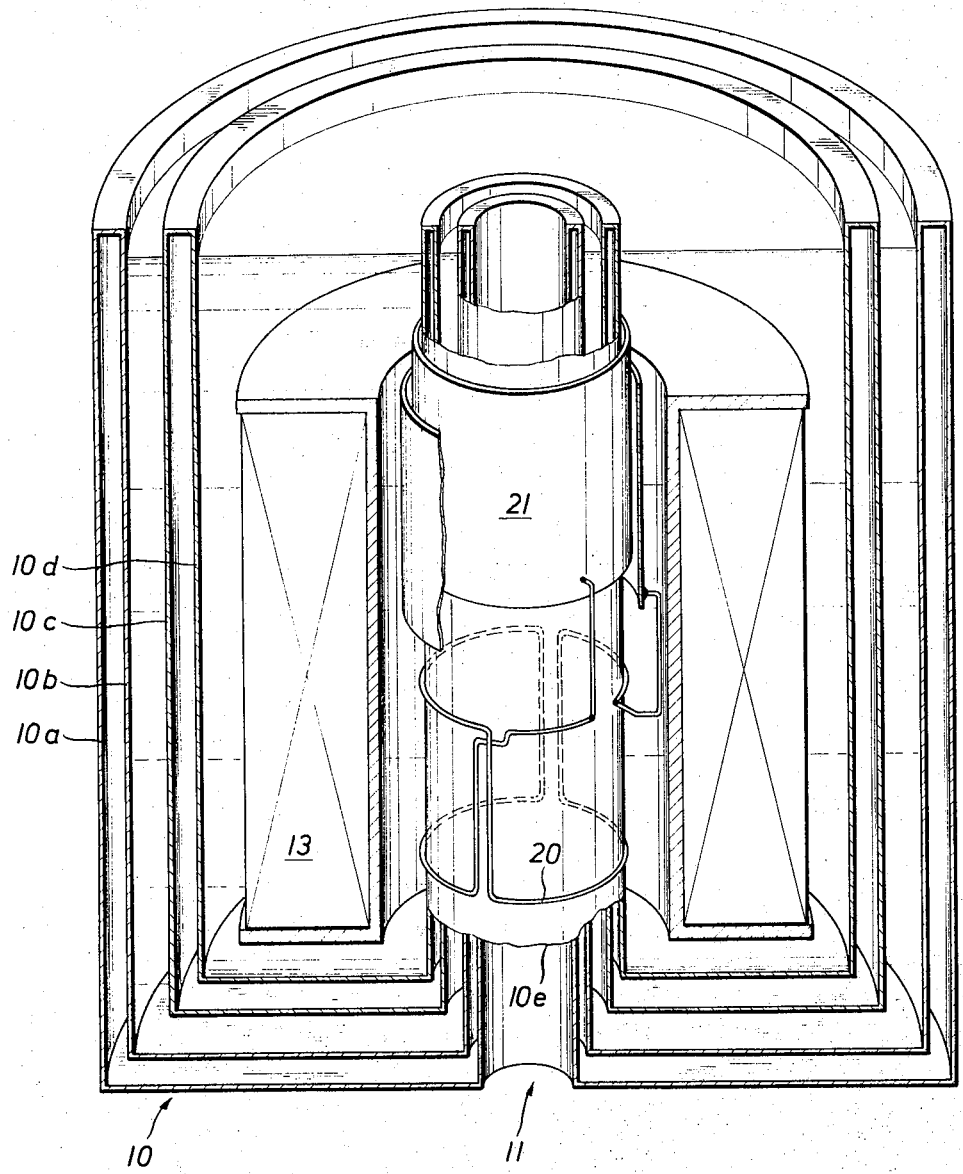
FIG. 2 is a view similar to FIG. 1 showing an alternative embodiment of the detection apparatus of the present invention.

While the foregoing describes one embodiment shown in FIG. 1, attention is next directed to FIG. 2 of the drawings. In FIG. 2, the container 10 is again illustrated and is preferably similar to that shown in FIG. 1. Moreover, the superconducting solenoid 13 is preferably included. Of significance in the FIG. 2 embodiment is the altered coil construction 20 and capacitor 21. The superconducting coil 13 forms a flux field axially of the passage 11. The coil 20 is wound in two loops so as to form a transversely extending magnetic field between the two loops. While additional turns can be included with the coil 20, the single turn arrangement shown in FIG. 2 is suitably adapted for the purposes noted to form a transverse field of sufficient magnitude. The coil 20 is preferably secured to the wall 10e by fitting snugly thereabout or by the use of suitable standoffs which secure the coil in position. It will be noted that the coil is supported at a central location in the passage 11 and is adapted to act on samples passed along the passage for spectroscopic analysis.

The capacitor 21 shown in FIG. 2 is preferably of concentric cylindrical construction. An inside cylinder or plate is placed immediately adjacent to or attached to the wall portion 10e. A concentric and encircling capacitative plate is positioned about the inner plate. The outer plate is held in position by appropriate standoffs which are incorporated preferably with the wiring communicating the coil 20 with the capacitor 21. Without regard to the mechanical means for securing the two plates in near proximity, the plates are maintained at a spaced distance one from the other, and variations in capacitance can be obtained by sliding one of the plates longitudinally of the passage 11 with respect to the other.

Suitable connections to the tank or resonant circuit including the coil 20 and the capacitor 21, are likewise provided with the present apparatus. Reference is made to FIG. 1 for illustration of suitable connection to the externally located NMR detector means, oscillator and output device.

In operation, the embodiment shown in FIG. 2 is used essentially in the same manner as that shown in FIG. 1. An advantage is obtained in the structure of FIG. 2 in that it is advantageous to place the magnetic field of the detector coil perpendicular to the magnetic field impressed on the sample. Superconducting magnet 13 and the coil 20 accomplish this purpose by forming magnetic fields which are at right angles to one another. Should a right angle field be desired in the structure shown in FIG. 1, it is necessary to use an externally located magnetic field wherein the pole pieces are placed perhaps on opposite sides of the cylindrical container 10 as shown in FIG. 1.

In operation, the structure of FIG. 2 is used in the same manner as that of FIG. 1. To avoid further belaboring the description of operation, reference is made to the foregoing discussion of operation of the embodiment previously described, and to the discussion hereinafter directed to improved sensitivity superconducting magnetic resonance apparatus.

Attention is next directed to FIGS. 3 and 4 of the drawings. In FIG. 3, the numeral 25 indicates a liquid helium Dewar container. Concentrically located walls 25a and 25b define an evacuated, insulating, thermal barrier wherein the facing walls are preferably silvered and the chambers evacuated to perhaps the same degree as noted with regard to the embodiment 10 of FIG. 1. Between the walls 25b and 25c is placed liquid nitrogen as indicated by the numeral 26. The space between the walls 25c and 25d is preferably evacuated and the opposing faces of the walls are silvered to provide a thermal barrier between the liquid nitrogen 26 and liquid helium 27 enclosed by the wall 25d.

When viewing FIG. 3, it will be noted that the various walls are generally cylindrical along their length and are nested one within the other. The walls 25a and 25b join at an encircling rim or edge 25e at the upper end of the container 25. The walls 25a and 25b are spaced one from the other. Suitable support means (not shown) secure the walls 25c and 25d within the container 25 in the liquid nitrogen bath 26.

Comparing the structure shown in FIG. 3, it will be noted that it provides a receptacle open at one end for receiving a sample to undergo spectroscopic analysis. By contrast, the structures shown in FIGS. 1 and 2 provide a passage fully through the apparatus for flowing samples and the like. This is not so provided in FIG. 3, and it will be appreciated that the sample is perhaps cooled substantially to 4°K when fully surrounded by the helium bath 27.

Suitable support means secure the concentric cylindrical walls 25c and 25d within the walls 25a and 25b. A cylindrical chamber 30 is suspended near the lower end of the helium bath 27 to provide a volume in which the sample is placed. More particularly, the chamber 30 encloses a coil 31 connected in parallel with a butterfly capacitor 32. The coil 31 includes a number of turns about the central axis of the chamber 30, and which are spaced along a suitable length so as to enclose a volume in which the sample is placed. The multiple plates of the capacitor 32 are preferably tunable to shift the resonance of the tuned circuits over a wide frequency range. One set of plates is joined to a central tubular member providing clear passage through the capacitor 32 while the other set of plates is joined to appropriate vertical support posts 32b and 32d. The coil 31 is joined to the terminal post 32b as a parallel connection of the two circuit components. The other end of the coil is grounded to the container which is also ground return of the capacitor. The container 30 may be used as a magnetic shield, if desired, and has some interaction with the coil field dependent on coil spacing, winding and container radius and other factors.

The chamber 30 is supported by a sample access tube 34. The sample access tube 34 is aligned centrally of the tubular member 32a of the capacitor for insertion of the sample by an appropriate elongate member to a point within the coil 31. The chamber 30 is closed at its top end except for access through the tube 34. Additionally, the chamber 30 is supported by two conduits 35 and 36. The three members 34, 35 and 36 extend to the upper end of the apparatus to a support means as will be described hereinafter. The conduits 35 and 36 receive appropriate conductors 35a and 36a which extend into the chamber and terminate at the illustrated support members 32b and 32d, respectively, joined with the capacitor 32. More particularly, teflon spacers 35b and 36b prevent the conductors 35a and 36a from contacting the conduits. In the preferred embodiment, the conduits 35 and 36 are preferably formed of metal as is the sample access tube 34. Suitable electrical insulation is provided to avoid grounding the signal applied to the tank circuit. It should be recalled that one end of the coil is grounded to the chamber 30 and one side of the capacitor is constructed with direct connection to the chamber also. Thus, the chamber and the metal connections extending from the chamber 30 to the exterior of the apparatus are ground connections.

It will be noted that the level of the helium in the container 25 is less than that of the liquid nitrogen 26. A plug 39 provides added thermal insulation above the helium bath. The three tubular members pass through the plug 39 which is fitted within a neck 40 joined to the cylindrical walls 25c and 25d. The neck has a flaired outer shoulder adapted to rest on a suitable support flange 41. A gasket 42 of suitable resilient material is placed on the flange and is abutted on its upper side by a coupling 43. The coupling 43 is a generally cylindrical collar having a vacuum line opening at 43a. The vacuum coupling 43a is connected with an appropriate vacuum pump for removing helium gas from the bath 27.

The cylindrical coupling 43 is open at its upper end and is sealed by a cap member 44. The cap 44 rests on a flange 43b which has a recessed groove for receiving a resilient O-ring 45. The cap member 44 is sealed to the coupling member 43, and is preferably secured in position by suitable clamps or the like.

The cap member 44 is preferably sealed at the sample access tube 34. Additionally, the signal conduits 35 and 36 are sealed by appropriate seal means 34a and 34b, respectively. It will be appreciated from the seal means described herein, the various gaskets noted, and other details of construction that the volume above the liquid helium is closed to the atmosphere and the only access is preferably communicated with a suitable pump for drawing gas from the volume to maintain the low temperature desired in the chamber 30.

It should be noted in FIG. 3 that both vacuum barriers are preferably evacuated, and to this end, a suitable connection is indicated at 46 whereby the space between the walls 25c and 25d is evacuated. If desired, similar means are provided for evacuation of the space between the walls 25a and 25b.

Attention is next directed to the enlarged sectional view of FIG. 4. The numeral 48 indicates the probe and detection apparatus which is contrasted with the slightly different structure shown in FIG. 3. More will be noted concerning the differences hereinafter. The probe and detection apparatus of FIG. 4 is intended for use in the single entrance Dewar container 25 shown in FIG. 3. Preferably, the apparatus 48 is inserted into the liquid helium bath for cooling to the superconducting temperatures. Again, it should be noted that the apparatus of both FIGS. 3 and 4 is intended for samples wherein superconducting temperatures will not damage or materially effect the sample itself.

A coil 50 within a container 51 is connected in parallel with a capacitor 52. The coil 50 is formed of suitably stiff wire to support its own weight to thereby position the axis of the coil 50 for receiving the sample within the coil. The leads at the two ends of the coil 50 are appropriately bent and shaped to connect with suitable terminal posts 52a and 52b. Preferably, the posts are insulated and are used as supports for a set of plates of the butterfly capacitor 52. An additional set of plates is movably mounted on suitable corner posts completing the butterfly capacitor 52, some posts being omitted from FIG. 4 by the sectional nature of the drawings. However, those skilled in the art are familiar with conventional butterfly capacitors and their details of construction. The present butterfly capacitor is likewise similar to known devices with the exception that superconducting material is preferably plated on the brass or copper structure of the capacitor.

The corner supports 52a and 52b, and other supports (not shown) of the capacitor 52 are joined to a suitable insulating wafer 52e. The wafer 52e provides structural integrity to the capacitor 52 and is itself supported from a pair of suitable support posts 52f and 52g. The support posts are joined to a closure member 54 adapted to seal the chamber 51 at its upper end. The closure means 54 is a circular member having a shoulder which is adapted to engage the container 51. The closure member 54 further incorporates a central collar 54a joined to a tubular member 55 by a set screw or the like. The member 55 extends through the means 54 and passes through the central opening of the insulating wafer 52e. The lower end is open and provides access through the capacitor 52 toward the coil 50.

Conventionally, butterfly capacitors are tunable by moving one set of plates with respect to the other. Since a number of suitable embodiments are available, it is believed unnecessary to detail construction of the capacitor 52 further than to note that the passage is provided centrally of the capacitor while yet permitting movement of the two sets of capacitor plates with respect to one another. This is shown in FIG. 4.

The member 55 is substantial in length and incorporates an open upper end 55a through which is received a sample carrier 56. The sample carrier 56 is a hollow, tubular member closed at the lower end 56a for receiving a sample 57 as illustrated. The sample is deposited in the cylindrical member 56 which is inserted into the tubular means 55 to a point within the coil 50 shown at the lower portions of FIG. 4. The outer surface of the tubular member 56 is fitted at spaced intervals with suitable spacer rings 58 to assist in guiding the sample 57 axially of the apparatus shown in FIG. 4.

The closure member 54 incorporates suitable openings for receiving electrical conduits 60 and 61. The preferred embodiment forms a coaxial conductor including the outer insulating shields indicated at 60 and 61 which are appropriately joined to the closure means 54. A centrally positioned conductor 60a and 61a, respectively, is supported in spaced relationship to the sheath by insulators 60b and 61b, respectively, and in consequence, a suitable arrangement is provided whereby signals for operation of the apparatus are communicated to the tank circuit comprising the coil 50 and the capacitor 52. More particularly, FIG. 4 illustrates the conductors connected at suitable points to the capacitor 52 upon emerging from the closure means 54.

The upper ends of the coaxial means 60 and 61 are supported by a suitable closure member indicated by the numeral 64. The conductors are terminated by suitable conduit connectors such as the BNC connectors shown in the preferred embodiment at 65 and 66. Additionally, the tubular member 55 passes through the cap 64. It will be appreciated that the closure members 54 and 64 structurally support the completed probe assembly which is adapted to be placed in the helium bath of a suitable receptacle.

The apparatus shown in FIGS. 3 and 4 is used in the same manner described hereinbefore. A suitable signal is supplied to the fitting 65 and 66 shown in FIG. 4 and the voltage across the detection circuitry indicates the occurrence of nuclear magnetic resonance. A sample is inserted into the coil within the helium bath and within a suitable magnetic bias field for testing. The apparatus of the present invention provides a tuned detection means of exceedingly high quality wherein the Q factor is increased from perhaps one hundred to values easily in excess of one million. Thusly, the detected signal indicative of resonance and from which qualitative and quantative characteristics of the sample are obtained is measured by the resonance apparatus cooperative with the present structure. Reference is made to the description of the other apparatus for analytical techniques for further understanding of its operation.

Figure 5:
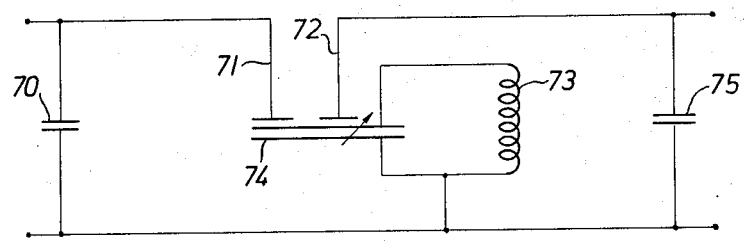
FIG. 5 is a schematic wiring diagram of a connective circuit for use with the present invention.

Attention is next directed to FIG. 5 of the drawings which illustrates in schematic form a coupling for the indicator and output means 14 shown in FIG. 1 and the detection means. The circuit is applicable generally to several embodiments of apparatus.

Note should be taken of various types of detection systems for measuring the electrical signal indicative of particle magnetic resonance. One technique is the use of a constant current source driving the resonant circuit through a small coupling capacitor. The voltage across the resonant circuit is measured by a suitable detector means coupled to an amplifier to prevent loading of the resonant circuit. In this apparatus, the measured voltage as a function of frequency indicates the resonant point of operation. Another technique is to use an oscillator incorporating the detector coil and capacitor in the circuit determining the oscillatory condition of the oscillator. The oscillator is maintained at a marginal point of operation which is altered by the parameters of the resonant circuit. As the energy absorption of the sample change with frequency, the voltage across the coil is likewise changed. This again is reflected by suitable output means. Other circuits are known in addition to the two foregoing circuits.

In FIG. 5, the numeral 70 indicates a relatively small capacitor normally associated with the signal source wherein the conductor 71 represents the conductor extending to the detection circuitry located within one of the superconducting containers described hereinabove. The output conductor is indicated by the numeral 72. The detection coil is indicated by the numeral 73, and is connected to the adjustable capacitor 74. The conductors 71 and 72 are input through relatively small coupling capacitors partially comprised of the tank capacitor 74. The output conductor 72 communicates with the suitable detector and indicating apparatus (not shown) which is represented as incorporating a suitable small capacitor to ground. The circuitry of FIG. 5 drives the superconducting resonant circuit in a suitable manner. However, the coupling circuit normally causes a large attenuation in the signal to the indicating circuitry because of impedance mismatch to the output means.

Figure 6:
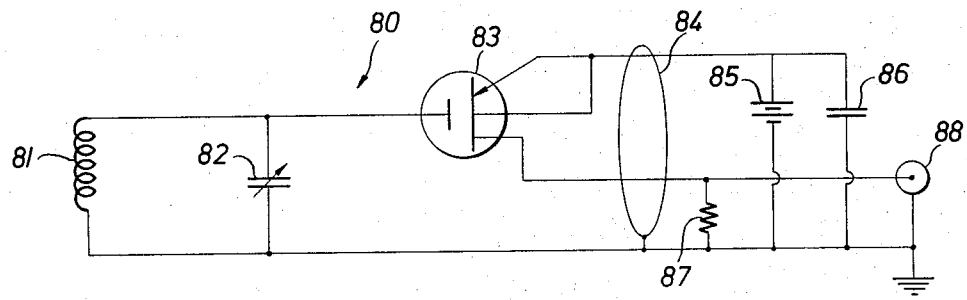
FIG. 6 is a schematic diagram of a suitable amplifying circuit for use with the present invention.

Attention is next directed to FIG. 6 of the drawings which illustrates an alternative impedance matching coupling circuit indicated by the numeral 80. Again, the superconducting coil is indicated by the numeral 81 and is parallel with the superconducting capacitor 82. The resonant circuit is communicated to the gate of a MOSFET means 83. The numeral 84 indicates the feedthrough connections resulting from placing the transistor 83 within the helium bath, which is thereupon operated at superconducting temperatures. The source of the transistor 83 is communicated by a suitable conductor to a battery 85 in parallel with a capacitor 86. Output signals from the drain of the capacitor 83 are developed across a resistor 87 and applied to a suitable shielded output terminal 88.

The circuit of FIG. 6 is converted into a self-oscillating type of magnetic resonance detector by connecting a regenerative feedback through either an active or passive feedback impedance. That is, a coil is loosely coupled to the coil 81 through the feedback impedance and to load resistor 87. The oscillator has an oscillation level at which it is most sensitive to the detection of the magnetic resonance absorption. This oscillation level is achieved by adjustment of the bias voltages applied to the transistor and the values the gain and phase shift of the regenerative feedback.

In operation of the circuitry 80, the transistor 83 is preferably placed with the capacitor and coil for operation at superconducting temperatures. The transistor 83 provides suitable amplification of the signal which is developed across the resistor 87 and communicated through the shielded terminal 88. Of particular significance in the coupling circuit 80 is the fact that the impedance loading the resonant circuit is exceedingly large and does not lower the Q of the resonant circuit. Given the benefit of the high impedance loading, the Q of the resonant circuit is permitted to approach its theoretical value, the value measured in an unloaded condition.

Figure 7:
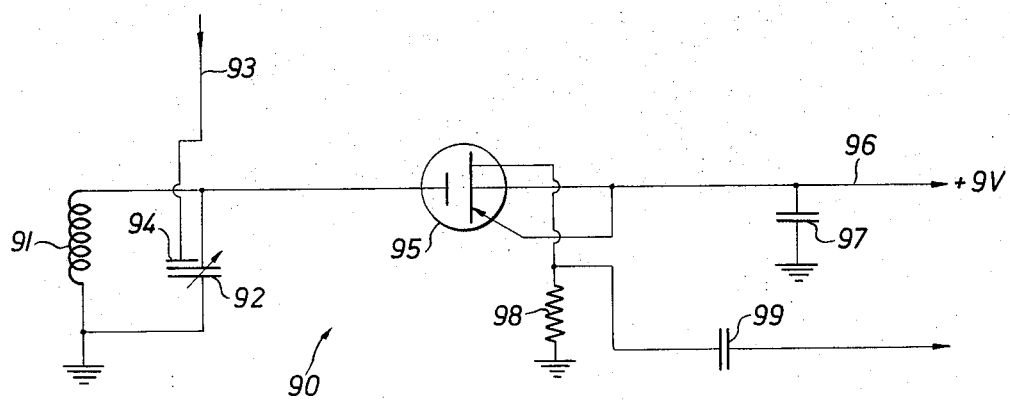
FIG. 7 is a schematic wiring diagram of an additional impedence matching and amplifying circuit for use with the detection means of the present invention.

Attention is next directed to FIG. 7 of the drawings which illustrates an additional impedance matching circuit indicated by the numeral 90. The resonant circuit including the coil 91 and variable capacitor 92 is driven by a suitable oscillator source through a conductor 93. The frequency for the resonant circuit is input through a capacitor 94 partially comprised of the adjustable capacitor 92. The resonant circuit is input to the gate of a MOSFET means 95 of exceedingly high input impedence. A suitable conductor 96 is communicated with a suitable voltage source and decoupled by a capacitor 97. The output signal from the drain is developed over a grounded resistor 98 from which a coupling capacitor 99 provides the output signal for the indicating apparatus described elsewhere.

In operation, the high impedance input of transistor 95 avoids loading the resonant circuit including capacitor 92 and the coil 91. The coupling capacitor 99 communicates the signal developed across the resistor 98 to the other apparatus.

The circuit of FIG. 7 is converted to a marginal oscillator by a regenerative feedback path converting the amplifier to a self-oscillating type of magnetic resonance detector. The tank circuit is connected to the feedback path and then to the load resistor 98. The same level adjustments for the oscillator sensitivity are made for the circuit 90 as for the circuit means 80 shown in FIG. 6.

Attention is next directed to FIG. 8 which illustrates a coupling circuit 100. A suitable oscillator 101 develops a high frequency signal across a resistor 102 which is then input to the superconducting chamber, the entrance of which is indicated by the numeral 103. The input signal on the conductor 104 is communicated with a capacitor 105. The capacitor 105 drives the resonant circuit, including the coil 106 and adjustable capacitor 107. At suitable high frequencies, say in the range of 30 megahertz, the capacitor 105 is preferably formed of a relatively small plate on the conductor 104 placed in physical proximity to the coil 106 and capacitor 107. Preferably, the ungrounded end of the two circuit elements is driven by the frequency from the source 101.

The transistor means 108 is preferably a MOSFET deriving its source potential from a conductor 110 communicating through the container opening 103. Because the conductor 110 is at some points parallel with the conductor 104, the coupling capacitors 111 and 112 prevent unwanted high frequency pickup. The drain signal is supplied through a conductor 113 passing out of the container opening 103 and thence to other circuitry as will be described. The transistor 108, and the other MOSFETs function as a "drain follower" or a low impedance signal source similar to an emitter follower.

A suitable blocking capacitor 115 and parallel resistor 116 input the signal from the resonant circuit to a transistor 117. The proper bias point of operation of the transistor 117 is determined by a voltage divider incorporating resistors 118 and 119. The quality of the supply voltage is improved by communicating the voltage source to an appropriate resistor 120 and capacitor 121 which is grounded. The collector load resistor is indicated at 122. The decoupled B+ is supplied to both the collector and the bias network of the base.

Additional bias voltage circuitry is included in the emitter wherein a resistor 123 and parallel capacitor 124 determines the average DC value of the emitter. The transistor 117 is used as a conventional amplifier stage driven by the output signal from the MOSFET 108. Significantly, the MOSFET has a high input impedance to prevent loading of the resonant detection means. The MOSFET 108 drives the transistor 117 which has a relatively low input impedance. However, the low input impedance has no particular effect on the resonant tank circuit and provides a suitable amplified signal at its collector.

A DC blocking capacitor 125 communicates signals to a demodulator circuit including the grounded resistor 126 and the diode 127. The negative peak signals passed by the diode 127 charge a capacitor 129 which is bled to ground by the resistor 128 in forming suitable envelope demodulation as communicated through the shielded output 130. In normal installations utilizing frequencies of perhaps as high as thirty megacycles from the source 101. Envelope detection is perhaps an easier way to transfer amplitude signals modulated on a high frequency carrier indicative of the analytical data.

The coupling means 100 is installed and used with the various superconducting containers shown herein. The frequency source 101 is located conveniently near the entrance 103 to the container while the resonant tank circuit and MOSFET 108 are positioned within the helium bath at superconducting temperatures. As noted hereinbefore, the energy absorption of the particles (electrons or nuclei) within the field of the coil 106 vary dependent on concentration and resonant frequency, and the resonant signal is derived through the conductor 113 communicating with the amplifier means positioned externally of the liquid helium bath.

The circuit means 100 in FIG. 8 is converted at either of two connections by an active or passive regenerative feedback path to a self-oscillating type of magnetic resonance detector. One alternative is connection of a feedback impedance between the wires 104 and 113. The other alternative is connection of the feedback impedance from the source resistor 102 to the collector of the transistor 117 after omission of the oscillator 101. Again, the level of oscillation is adjusted by changing the bias levels plus the feedback gain and phase shift to obtain maximum sensitivity for detection of the magnetic resonance signal.

One important benefit of the present invention is the overcoming of the Meissner effect. The Meissner effect is the expulsion of magnetic flux from the interior of the metallic member as it goes into the superconducting state. In the present apparatus, the Meissner effect has some bearing on the design of the RF coil and of the radiation shields. In the case of the RF coil, the superconducting wire causes magnetic field inhomogeneities which, if not corrected, may tend to spread the magnetic resonance absorption. FIG. 10 is a cross-sectional view of the distortions in the magnetic flux lines when the wire is superconducting. The flux lines are represented in polar coordinates $(r, \theta)$ by the equation $$[r - (R^2/r)] \sin\theta = C$$

where $C$ is a parameter having the values $\pm 1/2R$, $\pm R$, $\pm 3/2R$, $\pm 2R$, $\pm 5/2R$ for the lines shown in FIG. 10 where R is the radius of the wire.

To calculate the field distortions, one may consider the resulting magnetic field, H, due to the insertion of a superconducting wire in a steady dc magnetic field, $H_o$, as a superposition of $H_o$ and the field of an induced dipole, both parallel to the $\theta = 0$ axis;

$$H = [H_o + (2M/r^3)]\cos\theta \overline{m} + [-H_o + M/r^3] \sin\theta \overline{l}$$

$$H = h_r \overline{m} + h_\theta \overline{l}$$

where $\overline{m}$ and $\overline{l}$ are unit vectors, and $H_o\sin$ and $H_o\cos$ are the components of $H_o$, $(2M/r^3)\cos\theta$ and $(M/r^3)\sin\theta$ are the components of the dipole field, M is the induced magnetic moment and is given by:

$$M = -(H_oR^3/2) [1 -(3/\beta r)]C_oTH\beta + (3/\beta^2 R^2)$$

where $$\beta^2 = 1/\delta^2$$

and listing $\delta$ = magnetic field penetration depth. Typically, $\beta^2$ is approximately equal to $10^{10}$ cm$^{-2}$. Since $R >> 1/\beta$ in our case, M is approximately given by:

$$M = -H_oR^2/2$$

so that $$h_r = H_o [1-(R^3/r^3)]\cos\theta$$

and $$h_\theta = H_o [1-\tfrac{1}{2}(R^3/r^3)]\sin\theta$$

Thus, the deviation from the steady field, $H_o$, involves a term having the factor $(R/r)^3$ so that if $r = 10R$, this factor becomes $10^{-3}$. This means that the distortion is small when the coil is made from space-wound small-diameter wire.

In considering the Meissner effect on the tuned circuits, they are customarily formed of two lumped elements, an inductor, L, and capacitor, C, whose product defines the resonant frequency according to the relation $$f = 1/2\pi \sqrt{LC}$$

where
 $f$ = resonant frequency in cycles per second.
 $L$ = inductance henries.
 $C$ = capacitance in farads.

The physical configuration chosen for the tuned circuit is shown in the various drawings herein. The use of a normal shield can allow magnetic field penetration to the sample requires that the RF coil diameter be sufficiently small so that the coupling to the normal shield can is small. The discussion in Terman (Terman, *Radio Engineers Handbook*, McGraw-Hill, First Edition) shows the effect of the shield can on the inductance. The change in $Q, \Delta, Q$, due to the change in inductance $\Delta L$ is given by: $\Delta Q/Q = \Delta L/L$. In other words, the fractional change in $Q$ is equal to the fractional change in inductance for small changes in inductance. The discussion in Terman (above reference) shows that for a ratio of coil radius to shield radius of less than 0.3, there is little change in the inductance of the coil caused by the shield. Therefore, the ratio of coil diameter to shield diameter is preferably kept as small as possible in order to use a normal shield can which will permit the applied magnetic bias field to penetrate the shield can so that magnetic absorption is obtained. If a superconducting shield is used, the coil losses are smaller but none of the magnetic field penetrates through the superconducting shield to the coil to initiate magnetic resonance.

Attention is next directed to FIG. 9 of the drawings which illustrates a further arrangement of the present invention. In FIG. 9, the numeral 135 indicates a liquid helium bath similar to those discussed hereinbefore which provide superconducting temperatures. A passage 136 encircled by a coil 138 receives a sample for interaction with the field of the coil. Details of multiple wall thermal barriers have been omitted from FIG. 9 for sake of clarity. The passage 136 and the helium bath 135 are preferably insulated as previously described. The coil 136 is centered within a magnet 139 which forms an axial field acting on the sample to be analyzed. The coil 138 is not at the superconducting temperature but coils 140 and 141 are superconducting coils in the liquid helium bath.

The coil 138 is connected to the primary 140 of a transformer. The coil 140 serves as the primary coupled to a secondary coil 141. The coil 138 is transformer coupled with a capacitor 142 across the secondary of the transformer. Assuming proper matching of the transformer ratio, the capacitor 142 cooperates with the coil 138 to define a resonant circuit as taught hereinbefore.

The numeral 145 indicates a MOSFET amplifier means connected to the secondary of the transformer. As shown in FIG. 9, a resonant circuit at the input of the amplifier 145 includes the capacitor 142 and the inductance of the coil 138 as viewed through the transformer. The circuitry of the amplifier 145 is subject to variation but an appropriate example is shown in FIGS. 6 – 8. The amplifier 145 prevents loading of the resonant circuit through the use of a MOSFET input device. The output of the amplifier 145 is communicated to appropriate nuclear magnetic resonance detector and indicator apparatus.

The circuit means of FIG. 9 is converted into a self-oscillating magnetic resonance detector again by adding a regenerative feedback path from the output of the MOSFET Amplifier 145 either to the coil 141 or to coil 138. Again, the level of oscillation is adjusted by controlling the feedback gain and phase shift or the bias on the amplifier.

Each of the foregoing described circuits is adapted to communicate the resonant detection means preferably operated at liquid helium temperatures with a suitable indicator and output device. Those incorporating MOSFET circuitry are characterized by high input impedance, in the range of $10^{10}$ to $10^{14}$ ohms.

The benefits of the present invention as applied to chemical testing or medical investigations will be demonstrated by the table included herein. Apparatus known in the prior art has been able to measure resonance of samples, including hydrogen. Treating the measurements for hydrogen as unity, the table below shows the sensitivity for all of the natural isotopes of elements of interest. In some cases, the isotopes listed are not very abundant, but are selected because they have Z and A numbers which are not both even numbers. Thus, the sensitivity, compared to hydrogen, is a factor reflecting the relative sensitivity or insensitivity of the selected isotope and its percentage abundance or scarcity.

TABLE I

RELATIVE SENSITIVITIES OF THE NUCLEAR MAGNETIC RESONANCE MEASUREMENTS

| Isotope with Nuclear Magnetic Moment | Relative Abundance % | Relative Sensitivity in a Given Field | Relative Elemental Sensitivity |
|---|---|---|---|
| $H^1$ | 99.9844 | 1.0000 | 0.99844 |
| $C^{13}$ | 1.108 | $1.59 \times 10^{-2}$ | $1.76 \times 10^{-4}$ |
| $N^{14}$ | 99.635 | $1.01 \times 10^{-3}$ | $1.006 \times 10^{-3}$ |
| $O^{17}$ | 0.037 | $2.91 \times 10^{-2}$ | $1.076 \times 10^{-5}$ |
| $F^{19}$ | 100.000 | $8.34 \times 10^{-1}$ | $8.34 \times 10^{-1}$ |
| $Na^{23}$ | 100.000 | $9.27 \times 10^{-2}$ | $9.27 \times 10^{-2}$ |
| $Mg^{25}$ | 10.050 | $2.68 \times 10^{-2}$ | $2.69 \times 10^{-3}$ |
| $P^{31}$ | 100.000 | $6.64 \times 10^{-2}$ | $6.64 \times 10^{-2}$ |
| $S^{33}$ | 0.740 | $2.26 \times 10^{-3}$ | $1.67 \times 10^{-5}$ |
| $Cl^{35}$ | 75.400 | $4.71 \times 10^{-3}$ | $3.55 \times 10^{-3}$ |
| $K^{39}$ | 93.080 | $5.08 \times 10^{-4}$ | $4.73 \times 10^{-4}$ |
| $Ca^{43}$ | 0.130 | $6.39 \times 10^{-2}$ | $8.31 \times 10^{-5}$ |
| $Br^{79}$ | 50.570 | $7.86 \times 10^{-2}$ | $3.97 \times 10^{-2}$ |
| $Br^{81}$ | 49.430 | $9.84 \times 10^{-2}$ | $4.86 \times 10^{-2}$ |

On scanning the above table, it will be noted that oxygen is the most difficult element to measure. Assuming the use of spectroanalysis apparatus presently available and which is presently able to measure only hydrogen, an increase in sensitivity of 92,936 is necessary to measure the naturally occurring isotope of oxygen, $O^{17}$, an increase in sensitivity easily available on use of the present invention.

With the foregoing in view, it will be appreciated that chemical analysis, both quantitive and qualitative, is made available by the present invention to an extent not known before and with improvements in time required and circumstances of use. It is, therefore, with these goals in view that the embodiments of the present invention are set forth as examples of operation of the present invention and wherein the scope of the present invention is defined by the claims appended hereto.

I claim:

1. An apparatus finding use in analysis of various isotopes characterized by an atomic weight and mass number, one of which is not even, the apparatus comprising:
   a. sample receiving means for receiving and holding a sample therein;
   b. means for forming a unidirectional magnetic field acting on said sample receiving means and any sample therein;
   c. a detection coil means magnetically coupled with the sample in said sample receiving means;
   d. capacitor means connected in parallel to said detection coil means and forming a resonant circuit therewith;
   e. said detection coil means being formed of a material which is superconducting at or below a critical temperature;
   f. container means for receiving therein a liquid collant at or below the critical temperature, said detection coil means and said capacitor means being positioned therein for cooling to the superconducting state;
   g. amplifier means including a field effect transistor which transistor causes said amplifier means to have a relatively high input impedance connected to said detection coil means;
   h. means maintaining said amplifier means at a superconducting temperature, said amplifier means forming an amplified signal which is at least partially determined by magnetic resonance of the smple which is acted on by the magnetic field;
   i. said resonant circuit being connected to one of the terminals of said field effect transistor as an input thereto; and,
   j. a load impedance connected to said transistor for developing an output voltage thereacross.

2. The apparatus of claim 1 further including a voltage source connected to said field effect transistor, said load impedance developing an output signal dependent on the input signals to said load impedance for communicating magnetic resonance signals from the sample.

3. The apparatus of claim 1 further including:
   a. a conductor connected to said load impedance;
   b. a transistorized amplifier stage connected to said conductor; and,
   c. said amplifier stage forming an amplified output signal.

4. The invention of claim 1 wherein said sample receiving means includes a passage having an exposed inlet and outlet.

5. The invention of claim 1 wherein said sample receiving means includes a passage having a single opening.

6. The invention of claim 1 wherein said detection coil means includes a plurality of turns wound and positioned to form a flux field perpendicular to the unidirectional magnetic field acting on said sample receiving means.

7. The invention of claim 1 wherein said detection coil means includes a plurality of turns wound and positioned to form a parallel field perpendicular to the unidirectional magnetic field acting on said sample receiving means.

8. The invention of claim 1 further including:

a. an oscillator connected to said resonant circuit for providing a driving signal thereto;
b. and said load impedance is located remote from said amplifier means; and,
c. an additional and separate amplifier means connected to said load impedance for further amplifying the signal therefrom.

* * * * *